Nov. 11, 1958 M. THOMAS 2,859,984
THREADED CONNECTOR FOR ATTACHING ARMORED
CABLE TO A JUNCTION BOX WALL
Filed June 16, 1955
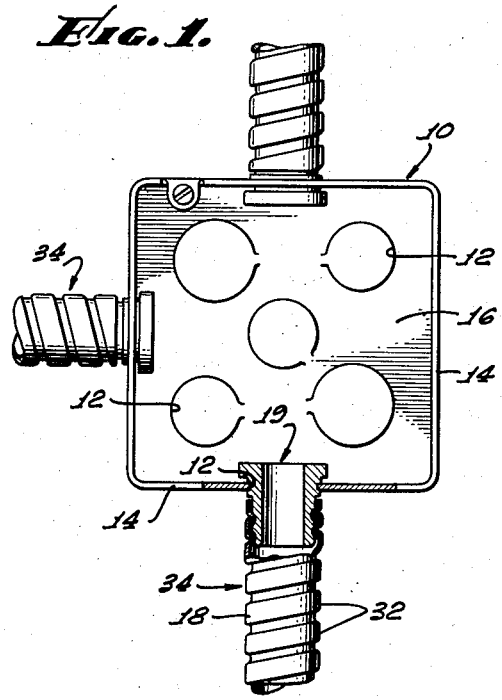
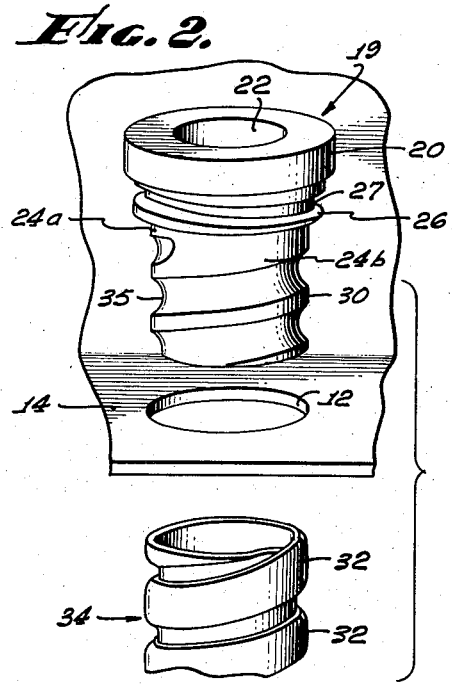
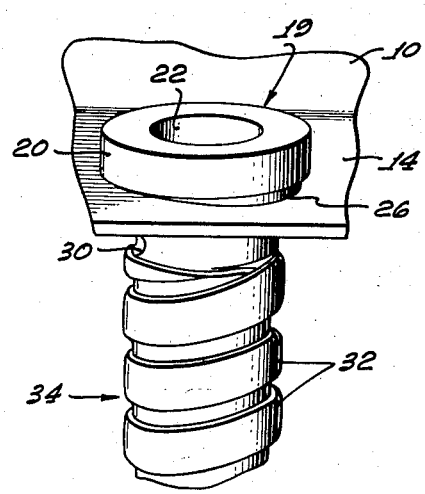
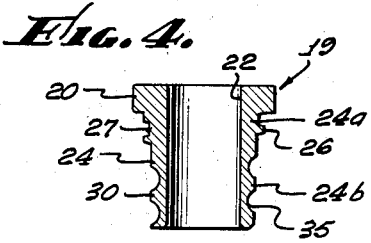
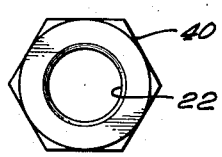
INVENTOR.
MICHAEL THOMAS
BY
ATTORNEY.

United States Patent Office 2,859,984
Patented Nov. 11, 1958

2,859,984

THREADED CONNECTOR FOR ATTACHING ARMORED CABLE TO A JUNCTION BOX WALL

Michael Thomas, Los Angeles, Calif.

Application June 16, 1955, Serial No. 515,834

2 Claims. (Cl. 285—158)

This invention relates to electrical connectors of the screw type, and particularly to connectors useful in junction boxes or other boxes into which wires or cables are led and connected to form joints.

It is customary in the wiring of buildings, or in bringing electric power to electric or electronic equipment, to protect the wires by insulation and by flexible metal tubing helically wound about the insulated wires. Armoured conductors or cables of this type are generally referred to in the trade as flexible conduit, or simply "flex." According to the usual practice, electrical connectors are provided in circuits using "flex" or other such cable by splicing the protruding wire ends to form joints or junctions between the separate cables. It is also customary to provide mechanical protection for the joints in the form of junction boxes of metal or other suitable material into which the wires or cables are led prior to splicing.

Heretofore, connections between the junction box and the cable have generally been provided by threaded connectors, male and female, secured to one another and to the cable through openings in the sides of the box. While the male element may be of a cast construction, the threads on the female element must be individually machined, at a considerable increase in construction costs. Moreover, the male element is often provided with a screw-receiving, threaded bore to facilitate fastening of the element to the cable, at a further increase in cost. As a result, such prior art devices are not only expensive to manufacture, but because of separate parts frequently require several time-consuming manipulative processes to assemble.

The present invention is directed to what now appears a simple solution to the problems enumerated above, and to many others as will appear. Accordingly, one object of the invention is to provide a connector for use in junction boxes, which is of a one-piece integral, inexpensive construction requiring no internal threads.

Another object of the invention is to provide a one-piece connector which may be easily and efficiently assembled into existing connector box construction, and in a moment's time.

Another object is to provide a junction box connector which naturally tends to tighten itself into a close fit between the junction box and a terminal portion of a connecting cable.

Another object is to provide such a connector that is inexpensive, easily produced and readily susceptible to assembly line production methods.

Further objects and advantages will be apparent from the following description and from the drawings in which:

Fig. 1 is a view in elevation of a junction box employing connectors according to the invention, with parts in section and with the wires omitted for the sake of clarity.

Fig. 2 is a view in perspective, on an enlarged scale, showing relative positions of a connector and cable prior to forming a connection.

Fig. 3 is a like view after a connection has been formed.

Fig. 4 is a view in section of a connector according to Figs. 1 to 3.

Fig. 5 is a top plan view of a modification of a connector constructed according to the invention.

Broadly the present invention relates to an electrical connector for use in a junction box of the type indicated generally at 10 in Fig. 1. Such a junction box is usually provided with a series of apertures 12 in its flanged sides 14 or in its base 16. The purpose of a connector is to provide a mechanical connection between a wire-supporting cable 18 and the box 10 so that the wire ends may be spliced into joints or junctions within the box.

Figs. 2 and 4 show an exemplary form of a connector constructed according to the invention. Basically the connector 19 is of a substantially cylindrical shape having a radial flange 20 adjacent one end. A cylindrical passage 22 is provided axially of the connector for the passage of wires or insulated conductors through the connector body 24. In a preferred construction the connector body and flange are cast all in one piece, and the body sub-divided into two distinct portions of different characteristics. An upper body portion 24a, adjacent flange 20, comprises essentially fine external threads 26 of modified square configuration which preferably form an axially outwardly expanding spiral merging into the flange. The threads 26 are provided with a pitch slightly greater than the thickness of the junction box wall, and consequently are adapted for threaded engagement with the apertures 12 in the box 10. In the illustrated apparatus the threads 26 are left-handed so that the connector body may be tightened into one of the openings 12 by counterclockwise rotation of the flange 20. Tightening occurs through engagement of the openings with inner and lower portions of a squared root 27 forming part of the spiral threads 26 which merge into the flange 20. When the connector body cannot be tightened any further, the flange 20 will be in engagement with the inner surface of the junction box wall and the connector body will be locked in position. In a preferred form, the root 27 expands slightly outwardly in a spiral, thereby, speeding the tightening. However, a helical configuration would also be suitable, as will be apparent to a worker in the art.

The lower body portion 24b of the connector, preferably cylindrical in form, is provided with opposed relatively coarse threads 30 which are adapted to engage in the windings 32 of an armoured cable, such as the flex cable 34 shown in the drawings. For this purpose, the threads 30 may be provided with a concave rounded root 35, and have a pitch approximating the windings of the cable. In the illustrated apparatus, opposed threads 30 are right-hand threads so that the connector and cable may be joined together by a counterclockwise rotation of the latter. To facilitate unrestricted passage to the threads 30 through an opening 12, the major diameter of the threads is less than the diameter of such openings and, preferably, is less than the diameter of any portion of the spiral threads 26.

In use, a connector of the invention may be inserted into one of the junction box apertures 12 and rotated to finger tightness. Preferably the slight outward spiral of threads 26 is provided in a minimum of turns so as to permit tightening in one to four revolutions of the connector. The cable 34 is then manipulated to a position adjacent the lower body 24b of the connector and turned counterclockwise into engagement with the threads 30 until sufficient tightness is obtained. For this purpose, it is preferable that the threads 30 be provided with a few more turns than the threads 26, as for example, two to six turns.

It is a feature of the invention that as a cable is tightened on the connector its motion will not loosen the upper threads 26 in their seat in the junction box 10. Instead, rotation of the cable will actually cause a further tightening of the connector in the opening 12. This occurs because the threads 26 and 30 are opposed so that a tightening movement of the cable upwardly on the connector produces an unique downward tightening of the connector within the unthreaded opening.

One important advantage arising from the novel construction of the connectors 19 is that no internal threads are required, either within the connector or within the apertures 12; nor is a female connecting member required. These advantages are a result primarily of the slightly tapering or stepped relation of threads 26 to threads 30 on the connector body. In other words, the major diameter of the threads 30 is just sufficient to pass through the opening 12 whereas portions of the thread root 27 have a diameter sufficient to frictionally engage the opening 12 in the manner described above. As will be apparent to one skilled in the art, the main body of the connector will pass freely through the opening and, upon rotation of the flange 20, the connector will be tightened into a slightly canted position within the opening. The degree of cant or tilt will be determined in each case by the pitch of the threads 26. However, as this slight cant is easily compensated for by the flexibility of the cable 34, it in no way detracts from the usefulness of the invention.

From the above description it will be evident that the invention makes possible electrical connections between armoured cable, and within the protective covering of a junction box, in a moment's time and with a minimum of effort. Moreover, the connectors of the invention may be simply and efficiently manufactured from a single piece of material, requiring no female threads, at a considerable reduction in production costs. If desired, the connectors may be modified somewhat to permit connections with more than one cable. For example, a single connector may be provided with two separate pairs of fine and coarse threads 26 and 30, with the pairs extending in opposite directions from a single stop flange located centrally of the connector. Such a modified device would have the advantage of facilitating connections between two separate cables independently of a junction box or within the box, as desired.

To those skilled in the art to which this invention relates, many changes in construction and widely differing embodiments and applications of the invention will suggest themselves without departing from the spirit and scope of the invention. For example, the flange 20 need not be circular as shown in Figs. 1 to 3 but may be hexagonal, as at 40 in Fig. 5 or may assume any other suitable shape permitting the desired tightening of the connection within the junction box. Accordingly, it should be understood that the disclosures and the description herein are purely illustrative and are not intended to be in any sense limiting.

I claim:
1. A one-piece connector adapted to be locked to a junction box having a wall provided with an unthreaded circular aperture therein and then adapted to lockingly receive a flexible, helically wound armored cable conduit for attachment to the box, comprising: a substantially cylindrical elongated member having a smooth axial passageway therethrough; a radially extending stop flange carried on one end of said member for locking engagement with the wall of said box; external threads formed on the surface of the other end of said elongated member, said threads being coarse and having a pitch approximately the pitch of the inside winding of the armored cable conduit and being provided with a concave rounded root; second external fine threads of modified square form provided on the surface of the elongated member adjacent said stop flange and with at least the threads toward said coarse threads being spaced apart axially a distance at least slightly greater than the thickness of the junction box wall, the root diameter of said second threads being less than the diameter of said aperture by an amount not exceeding the depth of a fine thread, the root of said fine threads forming an axially outwardly expanding spiral merging into said stop flange; the major diameter of said first threads being smaller than the diameter of the opening in the junction box and the major diameter of said second threads; one of said threads being right-handed and the other left-handed; whereby said connector can be locked to the wall of the junction box without the use of any tools and the cable conduit can then be screwed onto the connector and attached to the junction box without the connector being held by any additional means.

2. A connector as claimed in claim 1, wherein the distance between said second external fine thread diminishes into the surface of said stop flange.

References Cited in the file of this patent

UNITED STATES PATENTS

| | | |
|---|---|---|
| 178,310 | Leland | June 6, 1876 |
| 426,150 | Swann | Apr. 22, 1890 |
| 848,819 | Freeman | Apr. 2, 1907 |
| 1,273,859 | Hochberger | July 30, 1918 |
| 1,398,083 | Tibbetts | Nov. 22, 1921 |
| 1,680,229 | Pollock | Aug. 7, 1928 |
| 1,749,903 | Cannon | Mar. 11, 1930 |
| 1,775,128 | Hunter | Sept. 9, 1930 |
| 1,830,250 | Tiefenbacher | Nov. 3, 1931 |
| 2,353,030 | Green | July 4, 1944 |
| 2,475,322 | Horton | July 5, 1949 |
| 2,505,312 | Wagner | Apr. 25, 1950 |
| 2,530,258 | Marsan | Nov. 14, 1950 |

FOREIGN PATENTS

| | | |
|---|---|---|
| 106,651 | Great Britain | May 20, 1917 |
| 1,042,192 | France | June 3, 1953 |